United States Patent [19]
Inoue

[11] Patent Number: 5,923,864
[45] Date of Patent: Jul. 13, 1999

[54] VIRTUAL STORAGE ADDRESS SPACE ACCESS CONTROL SYSTEM INCLUDING AUXILIARY TRANSLATION LOOKASIDE BUFFER

[75] Inventor: Aiichiro Inoue, Yokohama, Japan

[73] Assignee: Fujitsu Limited, Kawasaki, Japan

[21] Appl. No.: 07/557,707

[22] Filed: Jul. 25, 1990

[30] Foreign Application Priority Data

Jul. 25, 1989 [JP] Japan ..................... 1-192267

[51] Int. Cl.⁶ ............................ G06F 12/00; G06F 12/08; G06F 12/10
[52] U.S. Cl. ..................... 395/400; 395/DIG. 1; 364/243.41; 364/256.3; 364/256.4
[58] Field of Search ....................... 395/400, 425

[56] References Cited

U.S. PATENT DOCUMENTS

| | | | |
|---|---|---|---|
| 4,945,480 | 7/1990 | Clark et al. | 395/400 X |
| 4,979,098 | 12/1990 | Baum et al. | 395/400 |
| 5,008,811 | 4/1991 | Scalzi et al. | 395/400 |
| 5,117,493 | 5/1992 | Jensen | 395/425 |

FOREIGN PATENT DOCUMENTS

A-036085   2/1981   European Pat. Off. .
56-140576  11/1981  Japan .
57-143783  9/1982   Japan .
A-1/177145 7/1989   Japan .

OTHER PUBLICATIONS

Nikkei Computer, Sep. 12, 1988, pp. 105–109.

*Primary Examiner*—Joseph L. Dixon
*Assistant Examiner*—Michael A. Whitfield
*Attorney, Agent, or Firm*—Staas & Halsey

[57] ABSTRACT

A virtual storage address space access control system has an access register having a plurality of access register numbers, a dynamic address translation unit and translation lookaside buffer for translating a virtual address to a real address by using a segment table designation. It further comprises first and second control registers for designating primary and secondary spaces, respectively, the primary and secondary spaces being accessed when the content of the access register is "1" or "0". Also included are access register translation lookaside buffer for indirectly obtaining a segment table designation by using a content of the access register and access register auxiliary translation lookaside buffer for directly obtaining the segment table designation by using the access register number.

7 Claims, 8 Drawing Sheets

| VALID | LOGICAL PAGE NUMBER | | PHYSICAL PAGE NUMBER | STD |
|---|---|---|---|---|
| | SEGMENT NUMBER | PAGE NUMBER | | |
| ... | ... | ... | ... | ... |

Fig. 3
PRIOR ART

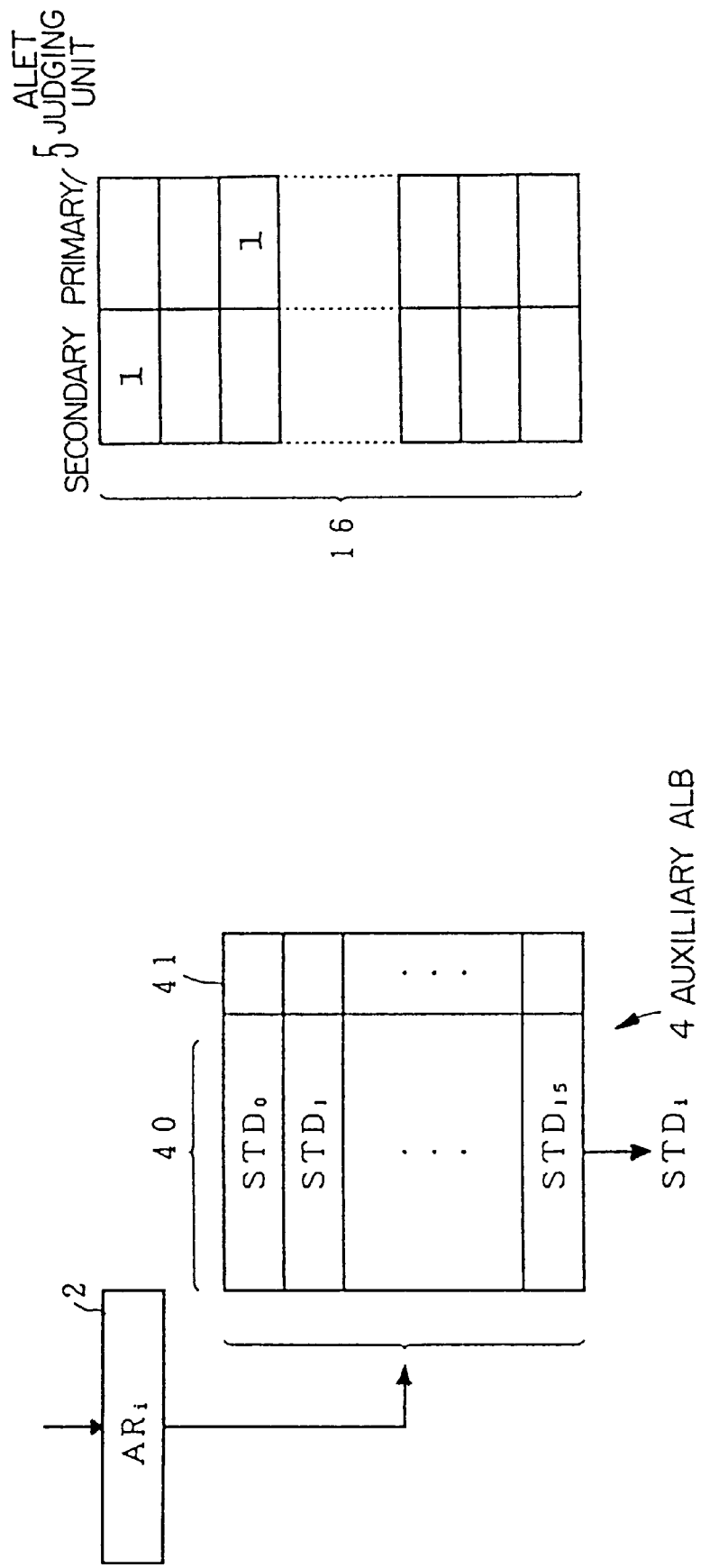

VIRTUAL STORAGE ADDRESS SPACE ACCESS CONTROL SYSTEM INCLUDING AUXILIARY TRANSLATION LOOKASIDE BUFFER

BACKGROUND OF THE INVENTION

The present invention relates to a virtual storage address space access control system for carrying out an access control of a virtual storage address space in a multi-virtual storage system and more particularly to a virtual storage address space access control system for performing an address translation from a virtual address to a real address at high speed.

In a conventional multi-virtual storage system, only access to the data in the address space designated by the control register is allowed. In order to refer to data in a plurality of address spaces, it is necessary to swap the content of the control register and the process of swapping the content of the control register is performed under the control of an operating system. It is impossible for a user program to carry out the process of data extending over a plurality of address spaces.

However, the amount of data to be dealt with by the data process system has greatly increased. Thus, a multi-virtual storage system with a new architecture for enabling a user's program to directly access data in an extremely large number of address spaces has been proposed. In such a multi-virtual storage system, a segment table necessary for performing the address translation can be accessed at high speed and a process for translating a virtual address to a real address needs to be realized.

Recently, a multi-virtual storage system with a new architecture using an access register has been put on the market.

As shown in FIG. 1, in the multi-virtual storage system, an access list is pointed to by the content (called ALET (access list entry table), hereinafter) of the access register accessed by a base register number and an ASN second table is pointed to by this access list. The segment table is designated in accordance with the segment table designation (abbreviated to STD in FIG. 1) determined by the ASN second table. Thus, the address translation from the virtual address to the real address can be adapted by using the dynamic address translation structure. In this structure, the user program loads ALET into 16 access registers. Thus, it is possible to access to an access list having a capacity of 1K or 4k. This makes it possible to select an extremely large number of segment table designations. Thus, a multi-virtual storage with a very large capacity can be utilized.

A computer system having a capacity of $2^{47}$ bytes as a logical space appears. In this case, when one page comprises 4K bytes, the number of logical pages is $2^{35}$. Therefore, it becomes very expensive if the page table is provided as a special hardware and the page table makes the effective physical space narrower when it is provided in a main storage. In this case, the logical space comprises one level comprising one page. A dynamic address translation (DAT) divides the logical page into segment number and page number and provides the page table in a normal logic space. Such method is called multi-level paging. In this case, the system comprises two levels comprising the segment table and the page table.

As shown in FIG. 2, the α-th record's content PTO counting from the head of the predetermined segment table is derived from the segment number α of the segment table and then the head address of the page table is obtained. The β-th record's content PFRA counting from the head address of the page table is obtained by using the page number β, thereby forming an upper part of the real address. The byte displacement γ of the virtual address is added as the lower part of the real address, thereby forming the real address. Regardless of whether the logical page is divided into the segment number and page number, it will increase the time necessary for the address translation to provide the page table in the main storage. In order to speed up the address translation, translation lookaside buffer (TLB) is provided as shown in FIG. 3. The translation lookaside buffer (TLB) is composed of an associative storage hardware having several tens to 256 entries. The translation lookaside buffer has a set comprising a valid bit, a logic page number (comprising a segment number and page number) a physical page number and segment table designation STD. The number of the set corresponds to the number of entries. For every memory access, a segment table designation STD of an address space to be accessed is compared with the segment table designation STD of the TLB and if a corresponding STD exists, the TLB is used. The comparison can be simultaneously performed for all the entries at high speed. If the STD of the address space to be accessed does not correspond with the STD in the TLB, the physical page number is determined by the above recited DAT.

The translation lookaside buffer is considered as a kind of associative mapping and comprises a table of the addresses which are most likely to be used and which are selected from all the addresses. This is effective because of the principle of localism.

The paging does not require an addition for the address translation. The address translation can be performed at high speed by using the translation lookaside table. The memory management is also easy because all the pages stored in the main storage are unlikely to be used again in the near future and the effectiveness in utilizing the main storage is high.

As shown in FIG. 2, when the number of multiple levels is two, the head address of the segment table can be obtained by using the segment table designation of a control register. As shown in FIG. 2, the structure for realizing a virtual storage with more than three levels is an extended space addressing structure. The extended space addressing structure translates an operand address of the instruction to a dynamic address by using an access register and an access list provided in the main storage. When dynamic address translation is performed, the data space segment table corresponding to the respective data space and the page table corresponding to the address space are used.

The lower portion (16 bits) of the access register with a width of 32 bits, for example, has an entry number ALET (0–65536) of the access list. Respective entries in the access list have widths of 16 bytes, for example. The field of the width of 25 bits of the access list has an ASN second table entry with a width of 24 bytes and a segment table destination STD with a width of 32 bits for the data space provided therein. This pointer mechanism indirectly performs an addressing of the data space by using 16 bits (ALET) in the access register, that is, the 16 bits (ALET) are added to the 31 bits addressing for the space address, thereby providing an architecture for 47-bit addressing. This technology is recited in detail for a Nikkei computer Sep. 12, 1988, pages 105 to 109.

In this multi-virtual storage system, a plurality of tables, namely, an access register, an access list and an ASN second table are sequentially accessed and the segment table designation can thereby be obtained. Therefore, there is a problem that it takes time to obtain the segment table designation. In the conventional art, to solve this program, an access register translation lookaside buffer (ALB) must be able to carry out a translation from the content (ALET) of the access register to the segment table designation at high speed, thereby obtaining a segment table designation at high speed.

First, one of the access registers is selected by the base register number, ALET is read out and then the access register translation lookaside buffer (ALB) is accessed by this read out ALET. When the valid entry having ALET which accords with the ALET read out from the access register exists in the ALB, the segment table designation stored in the entry is determined as the segment table designation for the main storage access. The determined segment table designation is thereby transferred to the dynamic address translation structure. When there is no valid entry in the access register translation lookaside buffer (ALB), the access list and ASN second table is sequentially accessed to provide the segment table designation. This segment table designation is determined as the segment table designation for the main storage access and is transferred to the dynamic address translation structure. Separately from this operation, in the conventional art, two address spaces comprising a primary space and a secondary space are designated by segment table designations in two control registers.

However, in such prior art technology, ALET is read out first and then the access register translation lookaside buffer determines the segment table designation in accordance with ALET, thereby providing two operation steps. Therefore, it takes too much time to obtain the required segment table designation. The problem is made more serious by the delay of the hardware, which occurs because the hardware of the access register and the access register translation lookaside buffer cannot be provided in the main part of the CPU. Namely, the volume (4 bytes×16) of the access register becomes relatively large. The volume of the hardware of the access register translation lookaside buffer becomes large so that the access register can have many effective entries. Therefore, this hardware can not be provided in the main part of the CPU, thereby causing the delay to be greater. Thus, the prior art has the problem that a high speed data process cannot be carried out.

SUMMARY OF THE INVENTION

An object of the present invention resides in a provision of a virtual storage address space access control system capable of performing an address translation from the virtual address to the real address at high speed by obtaining the neccesary segment table designation at high speed in a multi-virtual storage system of a new architecture utilizing an access register.

A feature of the present invention resides in a virtual storage address space access control system having an access register having a plurality of access register numbers, a dynamic address translation unit and translation lookaside buffer for translating a virtual address to a real address by using a segment table designation, comprising an access register translation lookaside buffer means for carrying out a translation from a content of the access register to the segment table designation, an access register auxiliary translation lookaside buffer means for carrying out a translation from said access register number to the segment table designation, means for judging whether the content of the access register accessed by the access register number designates a primary space or a secondary space, and means for selecting the segment table designation of the designated space when the judging means judges that the content of the access register designates the primary space or the secondary space, selecting the segment table designation maintained in the access register auxiliary translation lookaside buffer means when the judging means judges that neither of the primary and secondary spaces are designated and when the access register auxiliary translation lookaside buffer maintains the corresponding valid segment table designation, and selecting the valid segment table designation maintained in the access register translation lookaside buffer means when the judging means judges that the primary and secondary spaces are not designated and when the valid segment table designation is not maintained in the access register auxiliary translation lookaside buffer, thereby transferring the valid segment table designation to a translation lookaside buffer and dynamic address translation structure.

BRIEF EXPLANATION OF THE DRAWINGS

FIG. 3 is a view of a TLB translation lookaside buffer, FIG. 5B is a conceptual diagram of a first access register translation lookaside buffer shown in FIG. 5A and newly instroduced by the present invention, FIG. 5C is a data structure in the ALET judgment means shown in FIG. 5A.

DETAILED EXPLANATION OF THE PREFERRED EMBODIMENT

Figure 4:
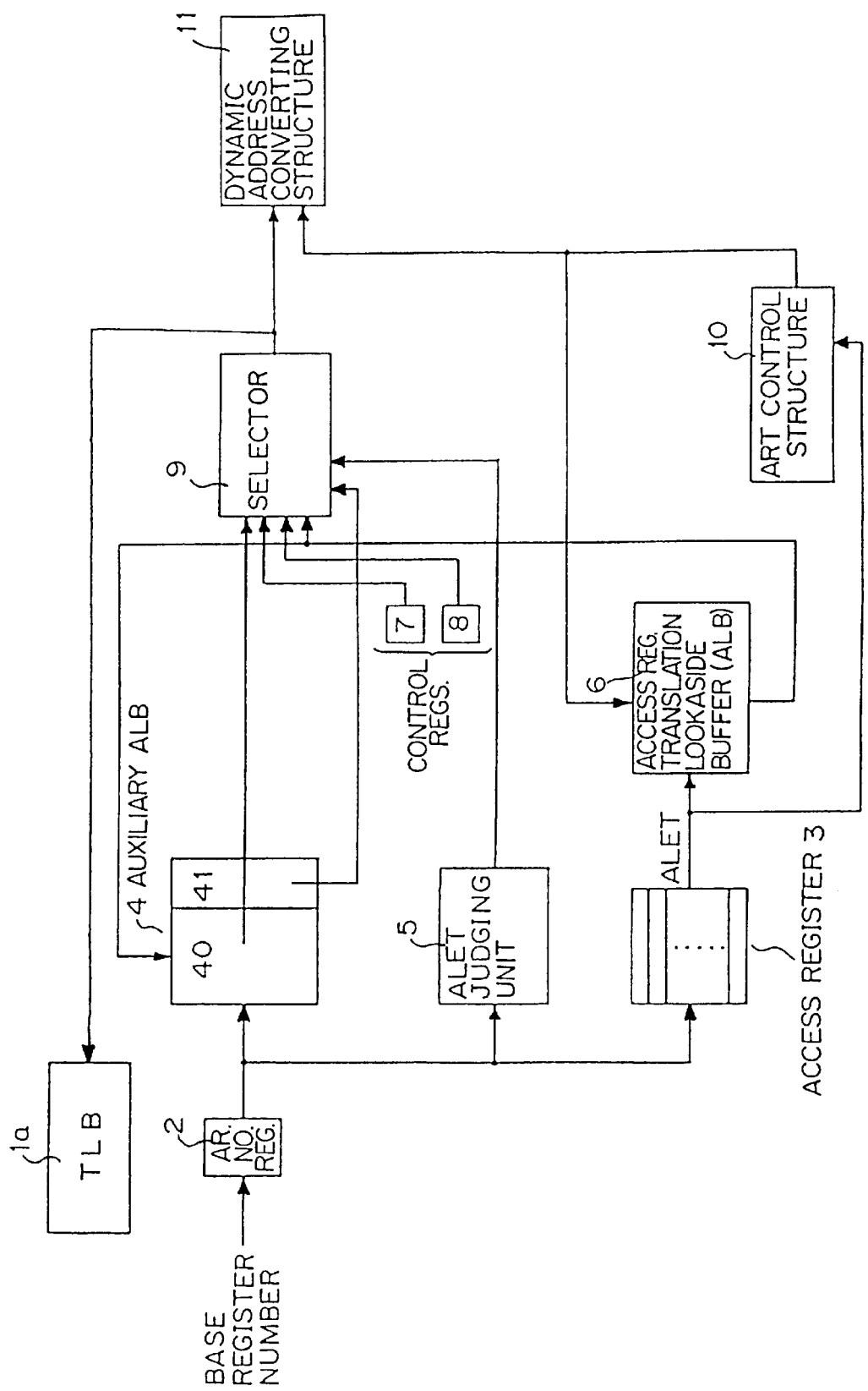
FIG. 4 is a block diagram representing a principle of the present invention.

FIG. 4 shows the principle structure of the present invention. 1a designates a TLB, which is formed as shown in FIG. 3 and is a translation lookaside buffer for performing an address translation from the virtual address to the real address at high speed without referring to the segment table and page table; 2 is an AR (address register) number register for maintaining the access register number designated by the base register number; 3 designates an access register comprising 16 entries (ALETs) and manages an ALET to determine the neccesary segment table designation; 4 is an access register auxiliary translation lookaside buffer (first ALB) equipped with STD translation means 40 for carrying out a translation from the access register number to the segment table designation at high speed and a valid flag management means 41 for managing the validity of the segment table designation maintained by STD translation means 40; 5 is an ALET judging unit which provides means for judging whether the ALET access register 3 of the designated access register number designates a primary space or a secondary space; 6 is an access register translation lookaside buffer (second ALB) for carrying out a translation from the ALET of the access register 3 to segment table designation; 7 is a first control register for maintaining the segment table designation of the primary space; 8 is the second control register for maintaining the secondary space segment table designation; 9 is a selector providing selection means for carrying out a selection process of the segment table designations read out from the access register auxiliary translation lookaside buffer 4, the access register translation index buffer structure 6, the first control register 7 and the second control register 8; 10 is an ART control structure for performing a translation from an ALET of access register 3 to the segment table designation by referring to the access list and ASN second table (shown in FIG. 2); and 11 is the dynamic address translation structure for performing an address translation from the virtual address to the real address by using the segment table designated by the predetermined segment table designation.

According to the present invention, ALET judging means 5 examines whether the ALET of the access register 3 which corresponds to the access register number maintained in the AR number register 2 designates a primary space or a secondary space. When the ALET designates a primary space or a secondary space, the process notifies selection means 9 which space is designated. When this notification is received, selection means 9 performs a selection such that, when the ALET of access register 3 accessed by the base register number designates the primary space, the segment table designation maintained by the first control register 7 is selected and the segment table designation is transferred to translation lookaside buffer TLB 1a and dynamic address translation structure 11, and, when the secondary space is designated, the segment table designation maintained in the second control register 8 is selected and the segment table designation is transferred to translation lookaside buffer TLB 1a and dynamic address translation structure 11.

On the other hand, in accordance with ALET judgment means 5, when the ALET of access register 3 of the access register number maintained in AR number register 2 is judged as not designating the primary space or secondary space, STD translation means 40 selects an entry in accordance with the access register number maintained in AR number register 2 and valid flag management means 41 detects whether or not the segment table designation in the entry of STD translation means is valid. When the validity of the segment table designation is detected, the access register auxiliary translation lookaside buffer 4 notifies selection means 9 of the segment table designation of this entry. When this notification is received, the selection means 9 transfers the notified segment table designation to translation lookaside buffer TLB 1a and dynamic address translation structure When it is judged that the valid segment table designation is not maintained in the access register auxiliary translation lookaside buffer 4 in accordance with the valid flag management means 41, access register translation lookaside buffer 6 specifies the corresponding valid segment table designation in accordance with the same process as in the prior art and notifies selection means 9 of the designation. Selection means 9 transfers the notified segment table designation to TLB 1a and dynamic address translation structure 11. When it is judged that the valid segment table designation is not maintained in access register translation lookaside buffer 6, ART control structure 10 determines the corresponding segment table designation through the access register and ANS second table and notifies the designation to the TLB 1a and dynamic address translation structure 11 in accordance with the same process as in the prior art and registers the segment table designation specified by ART control structure 10 in access register auxiliary translation lookaside buffer 4 and access register translation lookaside buffer 6.

As described above, when the segment table designation is received, TLB 1a obtains a real address using the segment table designation. Where TLB 1a can not carry out the dynamic address translation to the real address, dynamic address translation structure 11 uses a segment table designated by the segment table designation and carries out the translation process from the virtual address to the real address and registers the obtained translation result in TLB 1a, thereby completing the process.

As described above, the present invention is characterized in that access register auxiliary translation lookaside buffer 4, which is capable of immediately specifying the segment table designation from the access register number is newly provided. Access register auxiliary translation lookaside buffer 4 is equipped with an entry corresponding to the number of the addresses of access register 3. It can thus be implemented with a small volume of hardware and can be arranged in a main part of the CPU. According to the present invention, the required segment table designation can be obtained at an extremely high speed and an address translation from the virtual address to the real address can be carried out at a much higher speed than with the prior art address translation.

Figure 5A:
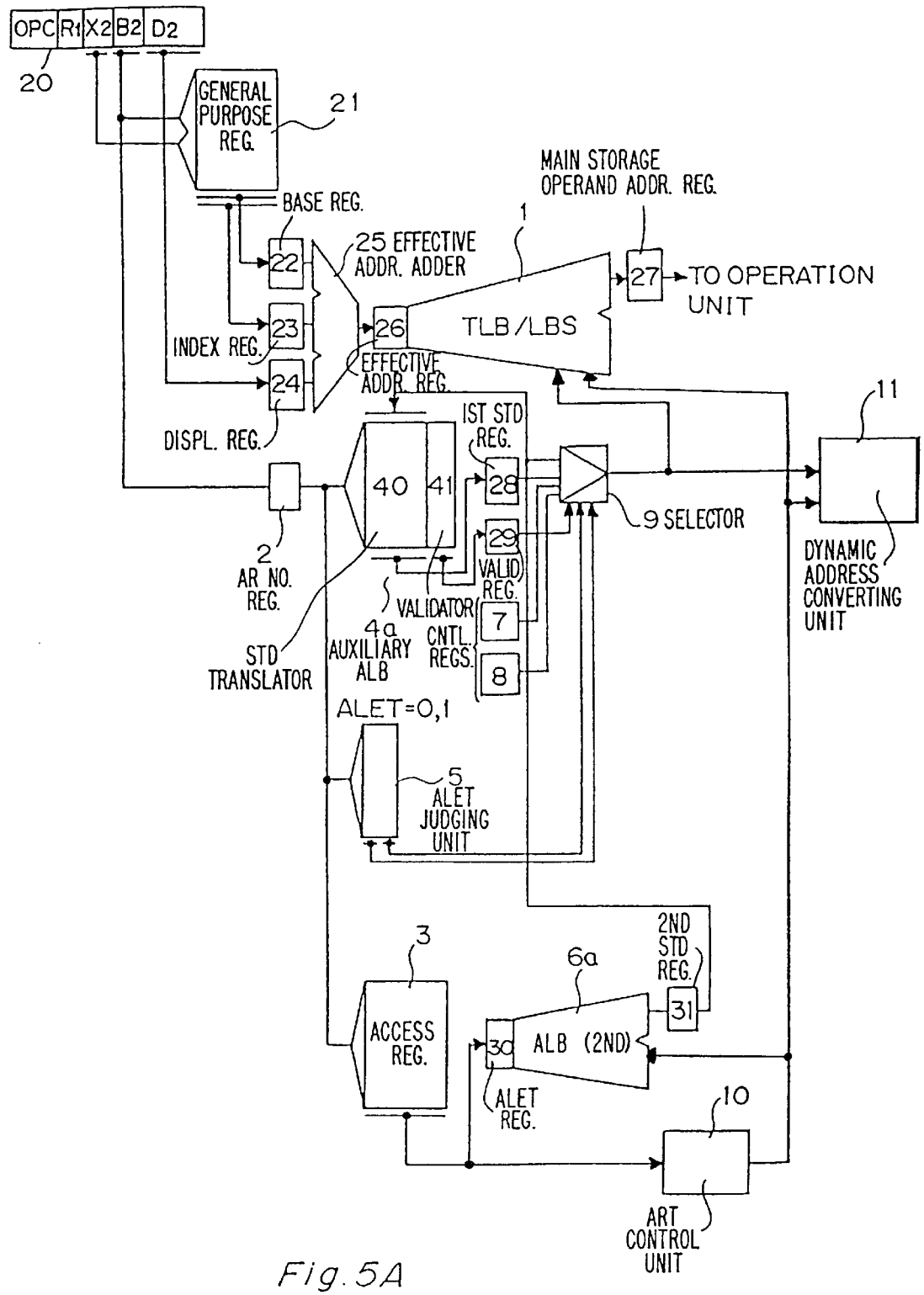
FIG. 5A is a block diagram of an embodiment of the present invention.

FIG. 5A shows the structure of an embodiment of the present invention. The same parts as that in FIG. 4 are designated the same reference symbols. Reference character 1 is TLB/LBS, 4a is a first ALB and corresponds to an access register auxiliary translation lookaside buffer 4 in FIG. 4, 6a is a second ALB and corresponds to the access register translation lookaside buffer 6 in FIG. 4, 20 is an instruction register for storing fetched instruction codes, 21 is a general purpose register, 22 is a base register, 23 is an index register, 24 is a displacement register, 25 is an effective address adder for adding address information maintained in base register 22, address information maintained in index register 23 and address information maintained in displacement register 24, thereby obtaining the virtual address of the access subject. 26 is an effective address register for storing the virtual address calculated by effective address adder 25, 27 is a main storage operand register for storing main storage operands obtained by the TLB/LBS 1, 28 is a first STD register for storing the segment table designation read from STD translation means 40, 29 is a valid register for storing valid and invalid flags read from the valid flag management unit 41, 30 is an ALET register for storing ALET read from access register 3, 31 is a second STD register for storing segment table designations obtained by the second ALB 6a.

FIG. 5B is a conceptual diagram of access register auxiliary translation lookaside buffer (first ALB) 4 containing 16 entries of segment table designations $STD_0$ to $STD_{15}$ and valid bits 41. AR number register 2 sends an access register number ARi which is used to directly access to the address of one of the 16 entries of the first ALB 4, thereby outputting segment table designation STDi stored in the address corresponding to ARi. Access register translation lookaside buffer (second ALB) 6a comprises a table showing a relation between the content ALET of each entry of the access register 3 and the segment table designation STD and is formed by making the content ALET of the access register 3 corresponding to the head address (namely, STD) of the segment table by by-passing the access list and ASN second address shown in FIG. 2.

FIG. 5C is a data structure in ALET judgment means 5 which has 16 entries each containing two bits. The access register number sent from the AR number register 2 is also used for accessing the address of the ALET judgment means. If the ALET of the access register 3 is "0", then "1" is stored in bit 1 of the judgment means 5, thereby accessing the primary space and if the ALET of the access register 3 is "1", then "1" is stored in bit 2 of the judgment means 5, thereby accessing the secondary space.

Figure 6:
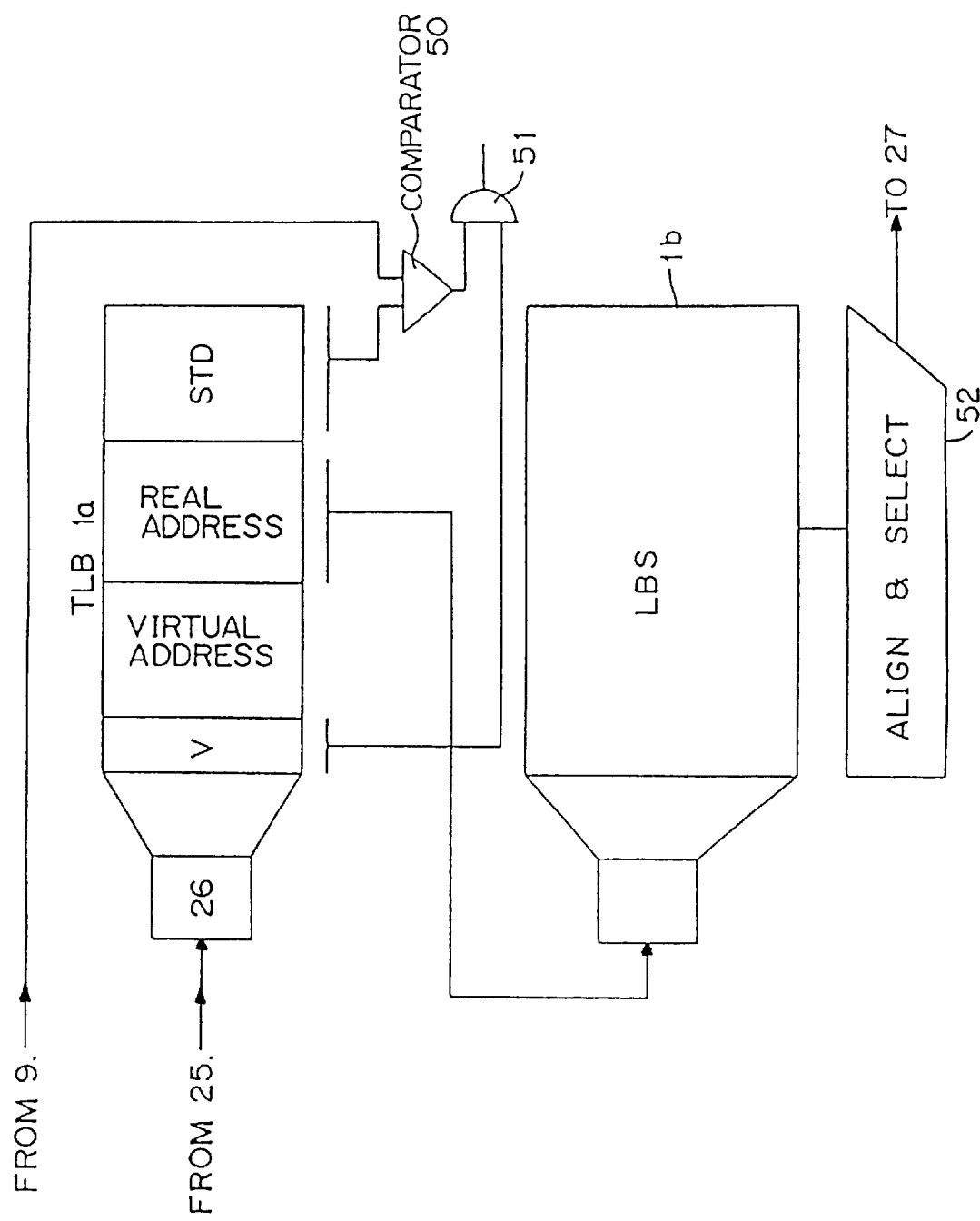
FIG. 6 shows a detailed block diagram of the TLB/LBS used in the embodiment shown in FIG. 5A.

FIG. 6 shows the detailed structure of the TLB/LBS 1. The TLB 1a is explained in FIG. 4 and LBS 1b forms a cache. As shown in this drawing, TLB 1a manages the relation between a virtual address and a real address, a valid bit and a segment table designation upon obtaining the relation between the addresses. When the segment table designation output from selection means 9 accords with the segment table designation managed by TLB 1a and the designated valid bit is valid, the real address is obtained. This real address is regarded as being effective. LBS 1b is a cache to be accessed by the real address of TLB 1a and data is input and output in block units. The hardware judges in data block units whether the data exists in the cache or not, then manages the data in block units and outputs the corresponding data to main storage operand register 27.

Next, the operation process of the present invention thus formed is explained.

Base register 22 maintains the base information of the address to be accessed by maintaining the address data of general purpose register 21 designated by the base register number ($B_2$ in FIG. 5A) of instruction register 20. Index register 23 maintains the index information of the address to be accessed by maintaining the address information of the general purpose register 21 designated by the index register number (designated by $X_2$ in FIG. 5A) of instruction register 20. Displacment register 24 maintains the displacement information of the address to be accessed by maintaining the displacement (designated by $D_2$ in FIG. 5A) of instruction register 20. AR number register 2 maintains the access register number which is the same as base register number ($B_2$).

Figure 7:
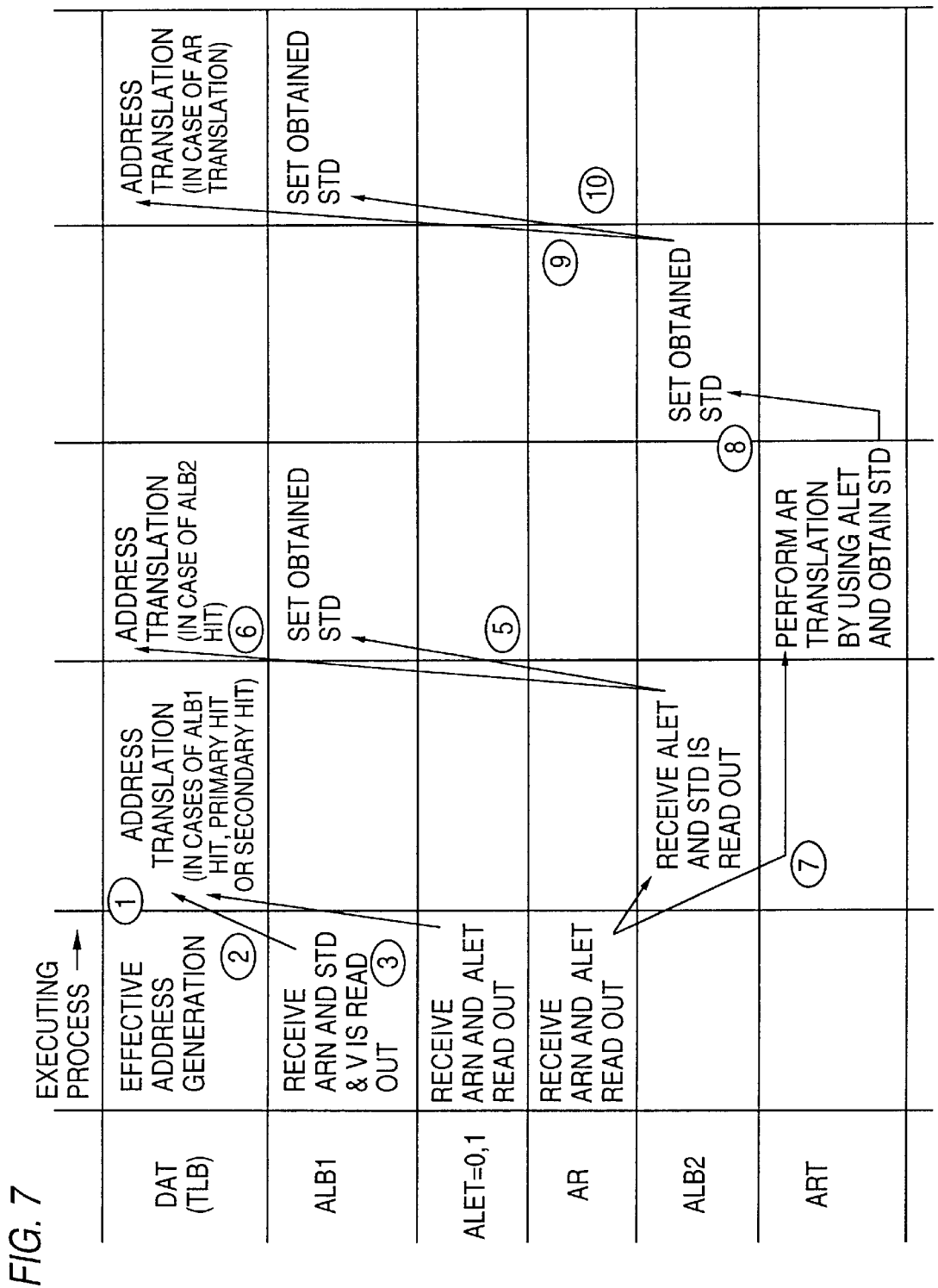
FIG. 7 shows a timing chart of the embodiment shown in FIG. 5A.

Therefore, when the data corresponding to base register 22, index register 23, displacement register 24 and AR number register 2, respectively, are maintained, TLB/LBS 1, the first ALB 4a, ALET judgment means 5 and second ALB 6a enter into a parallel execution of the respective processes, explained hereinafter. The timing chart of the parallel execution of the respective processes are shown in FIG. 7.

TLB 1a outputs the segment table designation STD, which is compared with the STD obtained from selection means 9 by a comparator 50. When the valid signal output from TLB 1a is valid, and when the STD of TLB 1a accords with the STD from the selection means 9, the output of the AND circuit 51 becomes 1. Then, the STD is not sent to DAT and the real address obtained from LBS 1b is utilized. When the STD from the TLB 1a does not accord with the STD from the selection means 9, the STD obtained from the selection means 9 is provided to DAT 11 to enable the DAT 11 to operate.

Namely, TLB 1a examines whether the real address corresponding to the virtual address calculated by the effective address adder 25 is regarded as being effective as an entry. When it is subjected to an entry as the effective address, it is output to be used for accessing LBS 1b and the main storage operand thus obtained is stored in main storage operand register 27 through an alignment and selection unit 52. This process enables the operation unit, not shown, to carry out the operation by using contents of LBS 1b. This is an operation ① for performing an address translation by TLB 1a as shown in FIG. 7, when the virtual address of the access subject is not subjected to an entry in TLB 1a as an effective address, dynamic address translation structure 11 is set to on-state, and, in accordance with the segment table designation produced at the earliest timing among the segment table designations obtained by the first ALB 4a, ALET judgment means 5, and second ALB 6a which operate in parallel to each other, the address translation from the virtual address to the real address is executed. The present invention is characterized by outputting STD at a high speed by using parallel processing.

ALB 4a examines whether the segment table designation corresponding to the access register number of AR number register 2 is validly stored as an entry therein. When the segment table designation is stored in the first ALB 4a as a valid entry, the segment table designation is stored in the first STD register 28 and the flag designating the effectiveness of the entry is stored in valid register 29. This is an operation ② shown in FIG. 7. Conversely, when the entry stored in the first ALB 4a is invalid because of a rewrite of ALET of access register 3, the flag designating the invalid entry is stored in valid register 29. When the entry in the first ALB 4a is invalid, the segment table designation is obtained from the access register 3 and the access register translation lookaside buffer 6a. The relation between the AR number and STD is then provided to the dynamic address translation unit 11 through selecting means 9, the new relation between them is stored in the STD translation means 40 and the corresponding valid bit is turned to "1". ALET judging means 5 examines whether the ALET of the access register number of AR number register 2 assigned to the access register 3 is "0" designating a primary space or "1" designating a secondary space and the judgment result is notified to selection means 9. This is an operation ③ in FIG. 7. The second ALB 6a reads the ALET assigned to access register 3 corresponding to the access register number of AR number register 2 and examines whether the segment table designation corresponding to the read-out ALET is stored as a valid entry. When the segment table designation is stored as the valid entry, the segment table designation is read out from second ALB 6a and stored in the second STD register 31. This is operation ④ shown in FIG. 7. Then, the STD is stored in the first ALB 4a. This is an operation ⑤ in FIG. 7. When the selection means 9 selects the segment table designation STD, the address translation is performed by using the segment table designation STD. This is operation ⑥ shown in FIG. 7.

Figure 1:
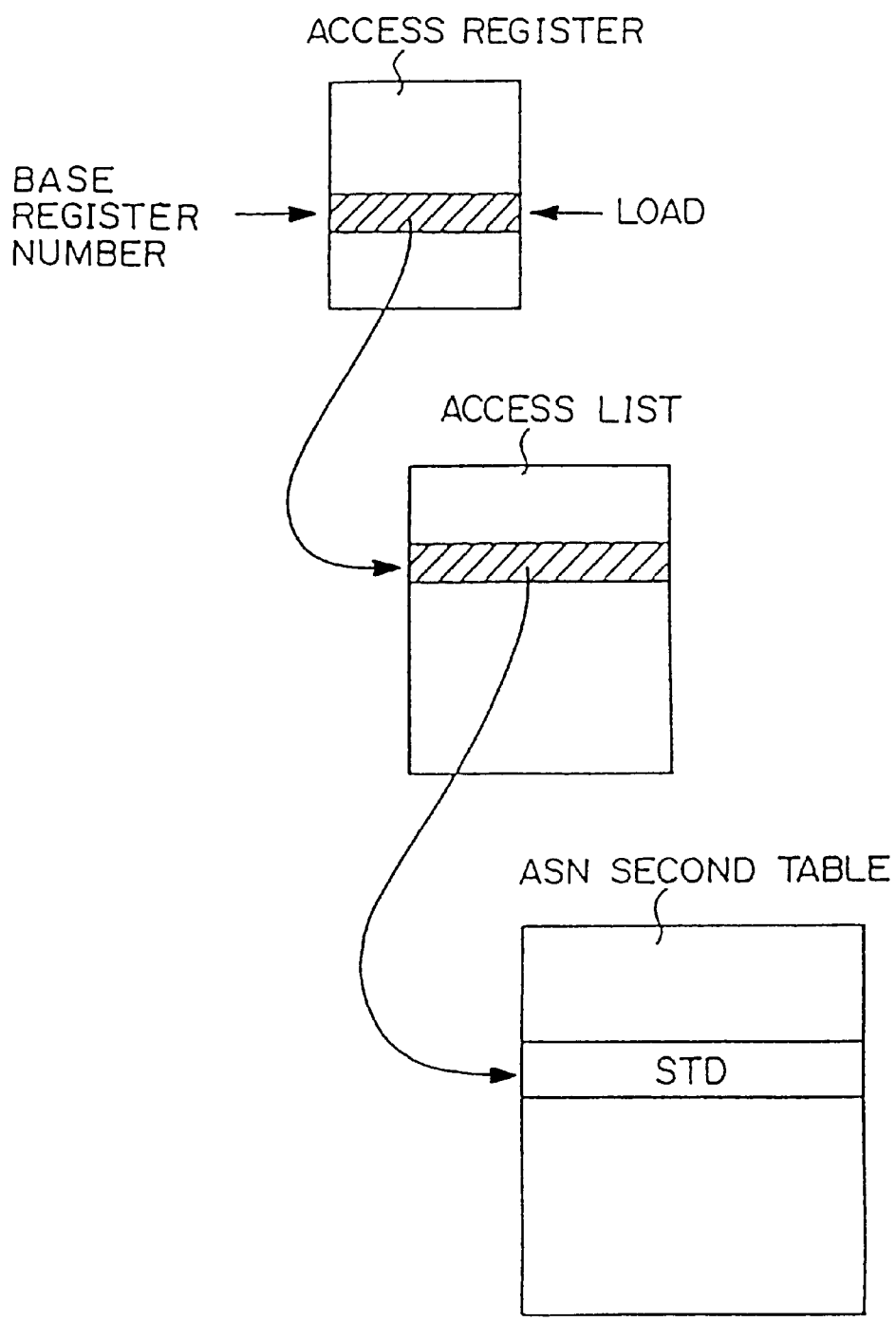
FIG. 1 is a block diagram of an address control of a multi-virtual storage system to which the present invention will be applied.
Figure 2:
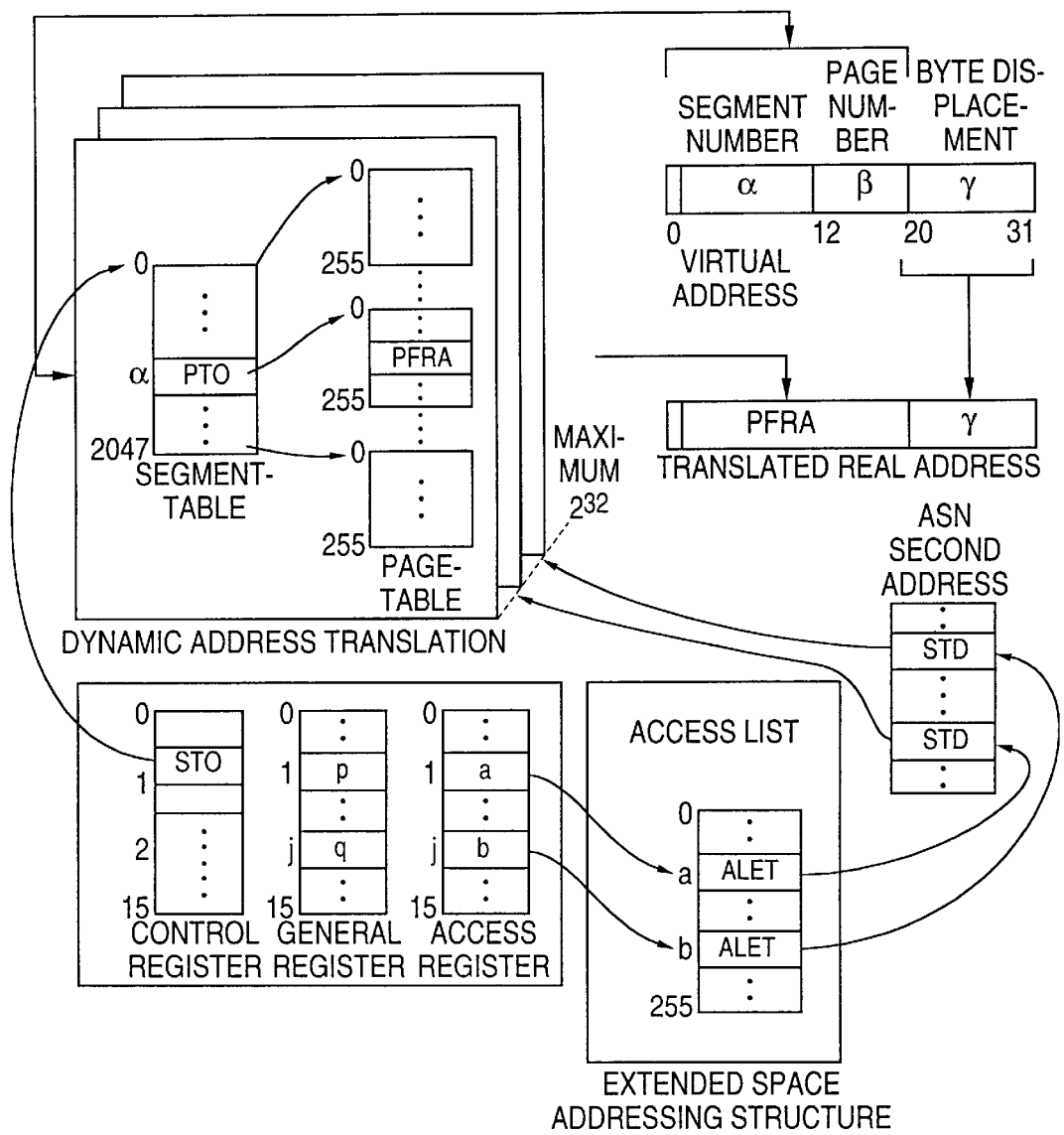
FIG. 2 is an explanatory view of an address translation to which the present invention will be applied.

When the second ALB 6a does not maintain the valid segment table designation, the segment table designation is determined by using ART control structure 10 in accordance with the access list and ASN second table stored in a main memory as shown in FIG. 2. These are operations ⑦, ⑧ and ⑨ of FIG. 7.

When the selection means 9 judges that the primary space is designated in accordance with the notification from ALET judging means 5, the segment table designation of the first control register 7 is selected immediately, regardless of the process of the first ALB 4a or the second ALB 6a and thus the segment table designation is transferred to TLB 1a and dynamic 4 address translation structure 11. When the secondary space is judged as being designated, the segment table designation of the second control register 8 is selected immediately, regardless of the process of the first ALB 4a and the second ALB 6a, and thus the segment table designation is transferred to TLB 1a and dynamic address translation structure 11.

TLB/LBS 1 is referred to by the segment table designation thus obtained and the main memory operand obtained as the result of the reference is transferred to the operation unit (not shown). When the dynamic address translation from the virtual address to the real address by using the TLB 1a cannot be performed, dynamic address translation structure 11 carries out the translation from the virtual address to the real address by using the segment table pointed by the segment table destination and the obtained relation between the virtual address and the real address is registered in TLB 1a. Therefore, in the present invention, by providing a priority to the primary space and secondary space to which an instruction is generally assigned, the instruction can be accessed at high speed and the decrease in data processing speed is avoided.

On the other hand, when the primary space and the secondary space is not designated, and the flag representing the validity is stored in valid register 29, selection means 9 selects the segment table designation stored in the first STD register 28 and transfers the segment table designation 2 TLB 1a and dynamic address translation structure 11. The above process can provide the main storage operand by accessing TLB/LBS 1 in the same manner as the primary space and the secondary space are designated and the main storage operand is transferred to the operation unit not shown. Conversely, when the flag representing the invalidity is stored in valid register 29, the selection means 9 selects the segment table designation stored in the second STD register 31 and transfers the segment table designation to TLB 1a and the dynamic address translation structure 11. By this operation, TLB/LBS 1 is accessed and the main storage operand is obtained so that it is transferred to the arithmetic operation unit. The relation between the access register number and segment table designation obtained by the second ALB 6a is registered in the first ALB 4a. This is an operation ⑩ shown in FIG. 7.

When the second ALB 6a carries out a translation process from ALET to segment table designation and then the second ALB 6a is being judged as not having the valid segment table designation, ART control structure 10 is started. The table is referred to by using the access list and ASN access table and thus the segment table designation is determined. Thus, the segment table designation is notified to TLB 1a and dynamic address translation structure 11. Therefore, TLB/LBS 1 is accessed and the main storage operand is obtained and transferred to the arithmetic operation unit. The relation between the access register number and segment table designation obtained by ART control structure 10 is registered in the first ALB 4a and the relation between ALET and the segment table designation obtained by ART control structure 10 is registered in the second ALB 6a.

Where, upon TLB/LBS 1 being accessed, the relation between the virtual address and the real address cannot be obtained because the valid entry does not exist in TLB 1a, the dynamic address translation structure 11 is started in the same manner as for the primary space and the secondary space. Then, the segment table and the page table are sequentially referred to by using the predetermined segment table designation and thus the relation between the virtual address and the real address is obtained and registered in TLB 1a. LBS 1b is referred to by using the registered relation. When the valid data exists, it is outputted and set in the main storage operand register 27 and then transferred to the arithmetic operation unit. Conversely, where the valid data does not exist in LBS 1b, the main storage apparatus is accessed and the data is obtained therefrom and stored in LBS 1b. The stored data is then set in main storage operand register 27 and transferred to the arithmetic unit.

The present invention is not limited to the above embodiment. For example, the present invention may read ALET of access register 3 and judge whether the ALET exists in the primary space or a secondary space. Alternatively, in place of the ALET, a latch representing the existence of a designation of the primary space and a latch representing the existence of a designation of the secondary space may be provided, enabling ALET to read out in an equivalent manner without accessing access register 3. This structure can determine the segment table designation at a higher speed. In the embodiment, in order to increase the speed of an operation, the segment table designation is determined in accordance with a parallel processing. The process can be carried out in a time divisional manner in accordance with the order in which selection means 9 selects the segment table designation, thereby determining the segment table designation.

As explained above, according to the present invention, the necessary segment table designation can be conducted at an extremely high speed and the address translation from the virtual address to the real address can be performed at a much higher rate than in the prior art. Further, a degree of the flexibility of the arrangement in the CPU can be increased.

What is claimed is:

1. A virtual storage address space access control system having an access register for storing a plurality of access list entry table numbers, a dynamic address translation unit and a translation lookaside buffer for translating a virtual address to a real address by using a segment table designation, comprising:

means for storing an access register number, access register translation lookaside buffer means for indirectly obtaining the segment table designation by using one of the access list entry table numbers stored in the access register, and access register auxiliary translation lookaside buffer means for directly obtaining the segment table designation by using the access register number.

2. The virtual storage address space access control system according to claim 1, wherein said access register auxiliary translation lookaside buffer means comprises memory for a plurality of segment table designations and valid bits designating whether corresponding segment table designations are valid.

3. The virtual storage address space access control system according to claim 1, further comprising first and second control registers for designating primary and secondary spaces, respectively, the primary and secondary spaces being accessed when the access register number corresponds to one of the access list entry table numbers having a value of one of "1" and "0".

4. The virtual storage address space access control system according to claim 1, wherein said access register auxiliary translation lookaside buffer means comprises a table designating a relation between possible values of the access register number and the segment table designation when the access register number corresponds to one of the access list entry table numbers having a value not equal to either of "1" and "0".

5. A virtual storage address space access control system having an access register for storing a plurality of access list entry table numbers, a dynamic address translation unit and a translation lookaside buffer for translating a virtual address to a real address by using a valid segment table designation, comprising:

an access register translation lookaside buffer for carrying out a translation from a selected access list entry table number to a first corresponding segment table designation, an access register auxiliary translation lookaside buffer for carrying out a translation from an access register number to a second corresponding segment table designation, means for judging whether the selected access list entry table number corresponding to the access register number designates one of a primary space and a secondary space, and means for selecting a space segment table designation of a designated space when said judging means judges that the access register number designates one of the primary space and the secondary space, for selecting the second corresponding segment table designation from said access register auxiliary translation lookaside buffer when said judging means judges that neither of the primary and secondary spaces are designated and said access register auxiliary translation lookaside buffer validly stores the second corresponding segment table designation, and for selecting the first corresponding segment table designation from said access register translation lookaside buffer when said judging means judges that neither of the primary and secondary spaces are designated and the second corresponding segment table designation is not validly stored in said access register auxiliary translation lookaside buffer, said selecting performed to provide the valid segment table designation to the translation lookaside buffer and the dynamic address translation unit.

6. The virtual storage address space access control system according to claim 5, wherein said access register translation lookaside buffer, said judging means and said access register auxiliary translation lookaside buffer operate in parallel with each other.

7. A method for controlling a virtual storage address space access controls system having an access register for storing a plurality of access list entry table numbers, a dynamic address translation unit and a translation lookaside buffer for translating a virtual address to a real address by using a segment table designation, comprising steps of:

(a) translating a selected access list entry table number to a first corresponding segment table designation by using an access register translation lookaside buffer, (b) translating an access register number to a second corresponding segment table designation by using an access register auxiliary translation lookaside buffer, (c) judging whether the selected access list entry table number corresponding to the access register number designates one of a primary space and a secondary space, (d) selecting a space segment table designation of a designated space when said judging determines that the access register number designates the primary space or the secondary space, (e) selecting the second corresponding segment table designation translated in step (b) by the access register auxiliary translation lookaside buffer when said judging determines that neither of the primary and secondary spaces are designated and the access register auxiliary translation lookaside buffer validly stores the second corresponding segment table designation, (f) selecting the first corresponding segment table designation translated in step (a) by the access register translation lookaside buffer, when said judging determines that neither of the primary and secondary spaces are designated and the second corresponding segment table designation is not validly stored in said access register auxiliary translation lookaside buffer, and (g) transferring for each access register number received by said virtual storage address space access control system, a single segment table designation, selected in one of steps (d)–(f), to the translation lookaside buffer and the dynamic address translation unit.

* * * * *